United States Patent
Buvril et al.

(10) Patent No.: US 8,943,920 B2
(45) Date of Patent: Feb. 3, 2015

(54) ROLLER SCREW

(71) Applicants: Gerard Buvril, Bourget du Lac (FR); Philipp Krebs, Lörrach (DE); Jean-Paul Giraudeau, La Motte Servolex (FR); Sebastien Lecluse, Gruffy (FR)

(72) Inventors: Gerard Buvril, Bourget du Lac (FR); Philipp Krebs, Lörrach (DE); Jean-Paul Giraudeau, La Motte Servolex (FR); Sebastien Lecluse, Gruffy (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/628,074

(22) Filed: Sep. 27, 2012

(65) Prior Publication Data

US 2013/0074622 A1    Mar. 28, 2013

(30) Foreign Application Priority Data

Sep. 27, 2011    (FR) ...................................... 1158640

(51) Int. Cl.
*F16H 1/24* (2006.01)
*F16H 55/02* (2006.01)

(52) U.S. Cl.
USPC ........................................................ 74/424.92

(58) Field of Classification Search
USPC ........................................... 74/424.91, 424.92
See application file for complete search history.

(56) References Cited

U.S. PATENT DOCUMENTS 2,683,379 A * 7/1954 Strandgren ................. 74/424.92
3,173,304 A * 3/1965 Strandgren ................. 74/424.93
3,406,584 A * 10/1968 Roantree .................... 74/424.92

FOREIGN PATENT DOCUMENTS

DE    19637526 A1    3/1998
EP    1617103 A1    1/2006

OTHER PUBLICATIONS

EPO Translation of DE19637526, Mar. 1998.*

* cited by examiner

*Primary Examiner* — Justin Krause
(74) *Attorney, Agent, or Firm* — Bryan Peckjian; SKF USA Inc. Patent Department

(57) ABSTRACT

The roller screw mechanism is provided with a screw comprising an external thread, with a nut arranged around and coaxial with the said screw, the nut comprising an internal thread, and with a plurality of rollers interposed between the screw and the nut and comprising flanks interacting with the said threads. The value of the opening angle α of the flanks of the external thread of the screw is greater than the value of the opening angle of the flanks of the rollers.

16 Claims, 5 Drawing Sheets

US 8,943,920 B2

ROLLER SCREW

TECHNICAL FIELD

The present invention relates to the domain of roller screw mechanisms permitting the transformation of a rotational motion into a linear translational motion, and vice versa.

BACKGROUND ART

Such a mechanism is provided with a screw comprising an external thread, with a nut arranged around the screw and comprising an internal thread, and with a plurality of longitudinal rollers in engagement with the external and internal threads of the screw and the nut. Compared to a ball screw mechanism, a roller screw mechanism has the main advantage of providing higher approved load capacities.

A first type of roller screw mechanism comprises rollers exhibiting an external thread in engagement with the external and internal threads of the screw and the nut, and rolling in the nut around the screw in a constant axial position. Such a mechanism is known as a planetary roller screw.

A second type of mechanism comprises rollers without threads but provided with grooves, located in the interior of which are the external thread of the screw and the internal thread of the nut. During rotation of the screw or the nut, the rollers are displaced axially in the nut. After one complete revolution, each roller is returned to its initial position by means of cams fixed to the extremities of the nut. Such a mechanism is known as a recirculating roller screw.

With the current design of roller screw mechanisms, the zones of contact of the rollers on the flanks of the thread of the screw are generally decentred towards the vertex of the thread. In a similar manner, the zones of contact of the rollers on the flanks of the thread of the nut may also be decentred towards the vertex of the thread. This requires the load capacities of the roller screw mechanisms to be limited in order to avoid the appearance of stress concentrations at the level of the vertex of the thread of the screw and/or of the thread of the nut.

The present invention proposes to overcome these shortcomings

SUMMARY

More specifically, the present invention proposes to make available a roller screw mechanism in which, for a given diameter, the load capacity is augmented.

In one embodiment, the roller screw mechanism is provided with a screw comprising an external thread, with a nut arranged around and coaxially with the said screw, the nut comprising an internal thread, and with a plurality of rollers interposed between the screw and the nut and comprising flanks interacting with the external and internal threads of the said screw and of the said nut. The value of the opening angle of the flanks of at least one of the said external thread of the screw and the internal thread of the nut is greater than the value of the opening angle of the flanks of the rollers.

In one embodiment, the value of the opening angle of the flanks of the external thread of the screw is greater than the value of the opening angle of the flanks of the internal thread of the nut.

In one embodiment, only the value of the opening angle of the flanks of the external thread of the screw is greater than the value of the opening angle of the flanks of the rollers, the value of the opening angle of the flanks of the internal thread of the nut being equal to the said value of the opening angle of the flanks of the rollers.

Advantageously, the value of the opening angle of the flanks of at least one of the external and internal threads is greater than or equal to 90°. The value of the opening angle of the flanks of at least one of the external and internal threads may be less than or equal to 110°. The value of the opening angle of the flanks of at least one of the external and internal threads is preferably greater than or equal to 91° and less than or equal to 95°.

In one embodiment, the flanks of the external and internal threads of the screw and of the nut are flat or rectilinear.

Each roller advantageously comprises an external thread in engagement, on the one hand, with the external thread of the screw and, on the other hand, with the internal thread of the nut. The flanks of the rollers may be convex.

The invention also relates to an actuating cylinder comprising a rotational drive means and a roller screw mechanism as defined previously, the screw of the mechanism being coupled to the drive means.

BRIEF DESCRIPTION OF THE DRAWINGS

The present invention will be understood more easily by reading the detailed description of the embodiments given by way of example, although these are in no way exhaustive, and illustrated by the accompanying drawings, in which.

DETAILED DESCRIPTION OF THE INVENTION

Figure 1:
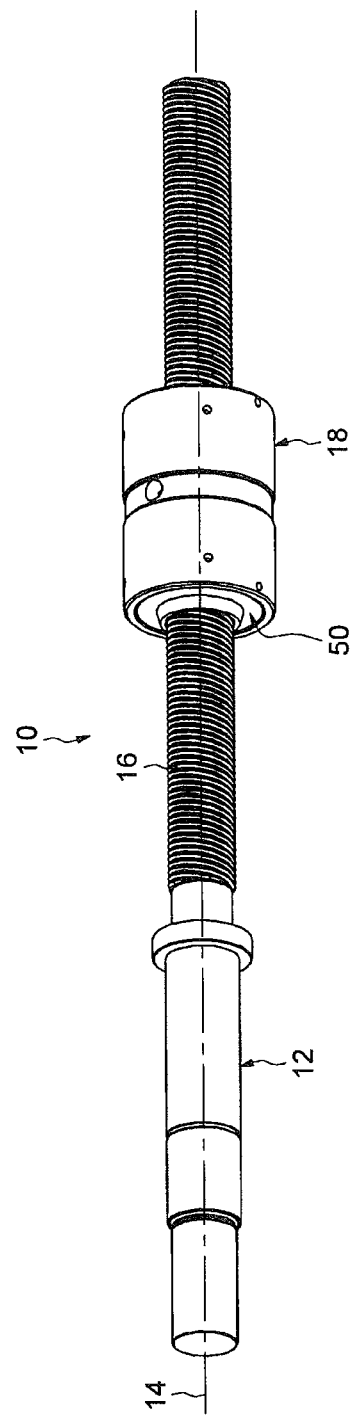
FIG. 1 is a perspective view of a roller screw mechanism according to a first illustrative embodiment of the invention.
Figure 2:
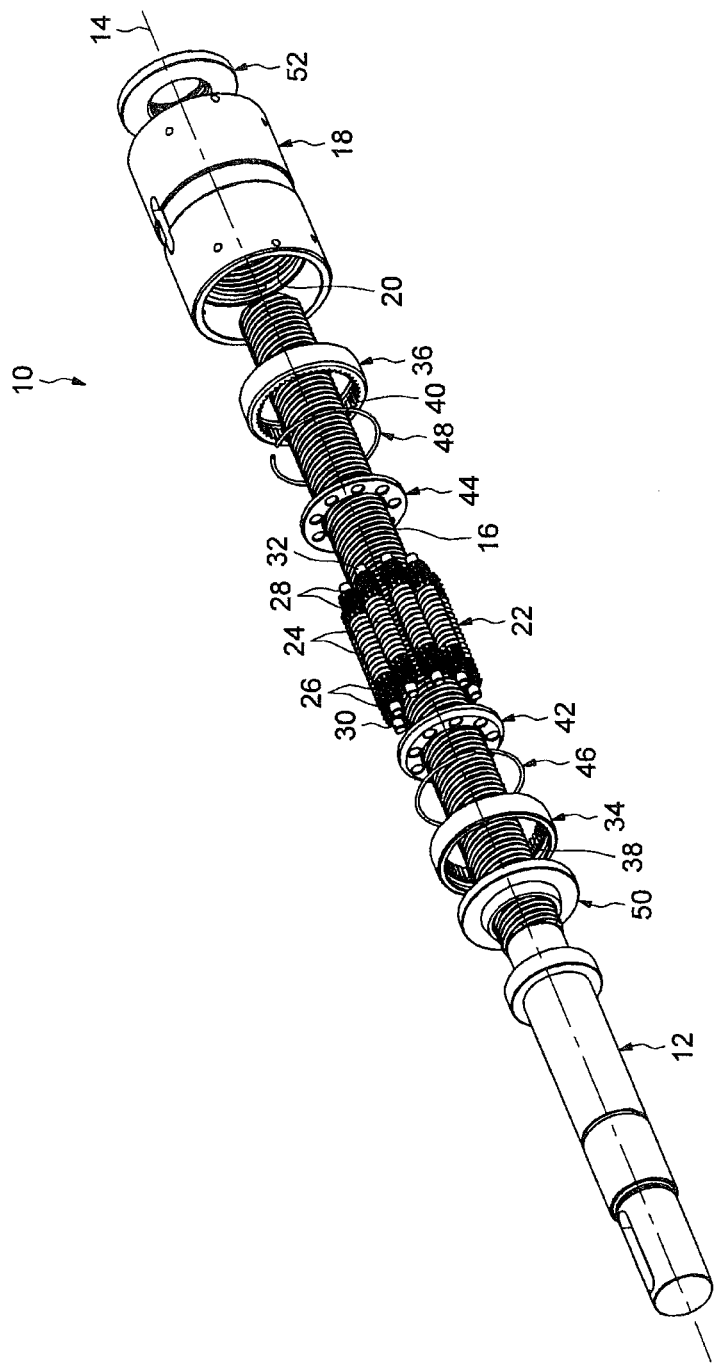
FIG. 2 is an exploded perspective view of the mechanism in FIG. 1.
Figure 3:
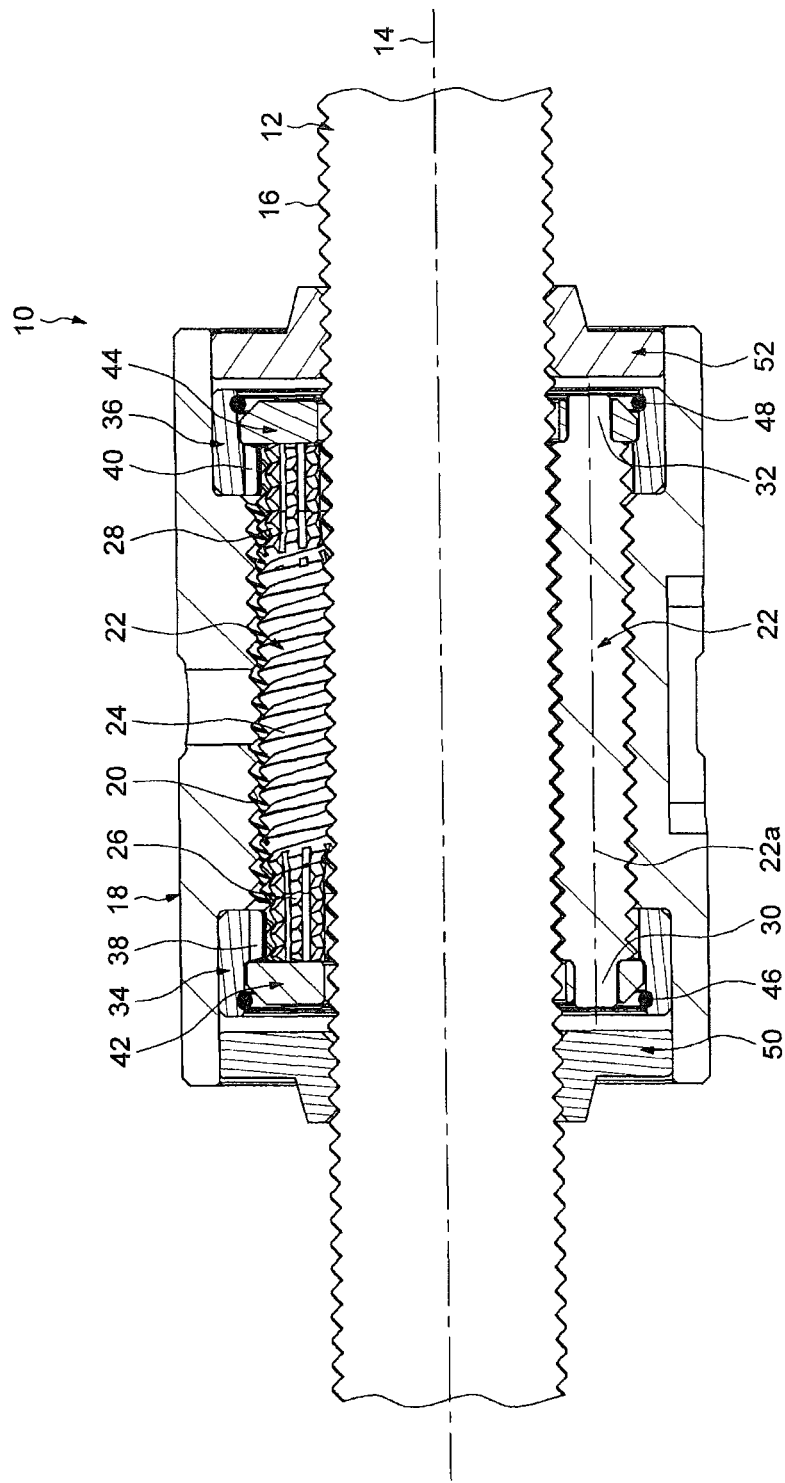
FIG. 3 is a partially sectioned view of the mechanism in FIG. 1.

In FIGS. 1 to 3, a roller screw mechanism, referred to as a whole with the designation 10, comprises a screw 12, having an axis 14, provided with an external thread 16, a nut 18 mounted coaxially around the screw 12 and provided with an internal thread 20 of which the internal diameter is greater than the external diameter of the external thread 16, and a plurality of longitudinal rollers 22 arranged radially between the screw and the nut. The screw 12 extends longitudinally through a cylindrical bore of the nut 18 on which the internal thread 20 is formed.

The rollers 22 are identical to each other and are distributed in a regular fashion around the screw 12. Each roller 22 extends according to an axis 22a that is coaxial with the axis 14 of the screw and comprises an external thread 24 in engagement with the thread 16 of the screw and the thread 20 of the nut. The threads of the screw 12, of the nut 18 and of the rollers 22 each comprise an entry. The thread 24 of each roller extends axially at each extremity through a set of teeth 26, 28, which is itself extended axially by a cylindrical journal 30, 32 extending towards the outside.

The mechanism 10 comprises two annular crowns 34, 36 that are fixed in a non-threaded part of the bore of the nut 18 and each comprising internally a set of teeth 38, 40 respectively in engagement with the set of teeth 26, 28 of the rollers for the purpose of their synchronisation. The mechanism 10 similarly comprises two annular rings 42, 44, each mounted radially between the thread 16 of the screw and the associated crown 34, 36 and comprising a plurality of cross cylindrical recesses (without reference designations) which are distributed in a regular fashion in the circumferential sense, and in the interior of which the journals 30, 32 of the rollers are located. The rings 42, 44 make it possible to carry the rollers 22 and to maintain their regular circumferential spacing.

The mechanism 10 also comprises circlips 46, 48 each installed in a groove provided in the bore of the associated crown 34, 36 and provided for maintaining axially the corresponding ring 42, 44, and two end caps 50, 52 secured in the bore of the nut in the vicinity of the said rings. The caps 50, 52 close the bore of the nut axially and each consists of a thread interacting with the thread 16 of the screw.

The threads 24 of the rollers and the thread 20 of the nut exhibit helix angles that are identical to one another and different from that of the thread 16 of the screw in such a way that, as the screw 12 turns in relation to the nut 18, the rollers 22 turn on themselves and roll around the screw 12 without being displaced axially in the interior of the nut 18. The rollers 22 are guided in rotation parallel to the axis 14 by the set of teeth 38, 40 of the crowns.

Figure 5:
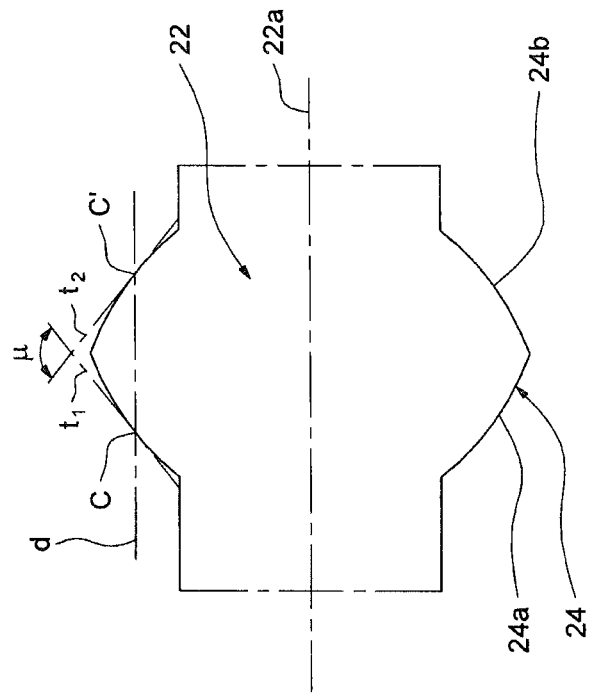
FIG. 5 is a detailed view of FIG. 4.
Figure 4:
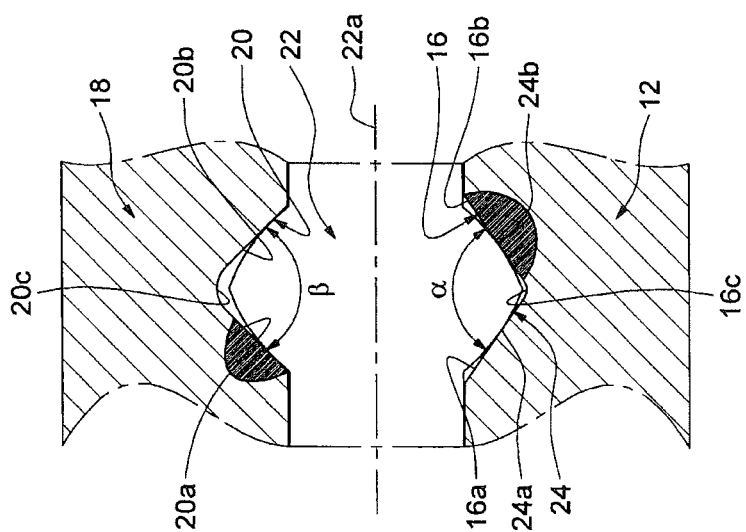
FIG. 4 is a detailed view of FIG. 3.

As illustrated in FIGS. 4 and 5, the flanks 24a, 24b of the thread of each roller exhibit in cross section a convex profile formed by two circular arcs that are symmetrical in relation to a radial median plane perpendicular to the axis 22a of the rollers. The opening angle μ of the flanks 24a, 24b is defined by the angle formed, on the one hand, between the tangent $t_1$ to the point C of the flank 24a situated on the pitch diameter d of the roller and, on the other hand, between the tangent $t_2$ to the point C' of the flank 24b situated on the said pitch diameter d.

The thread 16 of the screw exhibits in cross section a triangular profile delimited by two rectilinear flanks 16a, 16b opposite one another and connected together by a concave base 16c. The flanks 16a, 16b are symmetrical in relation to the radial plane passing through the base 16c and perpendicular to the axis 22a of the rollers. The value of the opening angle α formed by the flanks 16a, 16b opposite the thread 16, for example, is greater than or equal to 90°, and is advantageously less than or equal to 110°. The value of the opening angle α is preferably greater than or equal to 91° and less than or equal to 95°.

The value of the opening angle α of the flanks of the thread 16 of the screw is greater than the value of the opening angle μ of the flanks of the thread 24 of the roller. Thus, the contact of the rollers 22 on each flank 16b, or 16a, of the thread of the screw is situated substantially midway between the base 16c and the vertex of the thread 16. When in operation, during the transmission of the forces, the contact pressure exerted by the flanks 24b at the level of the points C', or by the flanks 24a at the level of the points C, of each roller on the flanks 16b, or 16a, is distributed over the entire length of the said flanks. In the Figure, the contact pressure is schematically modelled according to Hertz's theory. For each flank 16b, or 16a, of the thread of the screw, the stresses applied by the rollers 22 are distributed substantially over the entire length of the flank. Better distribution of any stresses is obtained in this way.

The thread 20 of the nut lies radially opposite the thread 16 of the screw and exhibits in cross section a triangular profile delimited by two rectilinear flanks 20a, 20b opposite one another and connected together by a concave base 20c. The flanks 20a, 20b are symmetrical in relation to the radial plane passing through the base 20c and perpendicular to the axis 22a of the rollers. In this embodiment, the value of the opening angle β formed by the flanks 20a, 20b is less than the value of the opening angle α of the flanks 16a, 16b of the thread of the screw. The value of the opening angle β, for example, is less than 90°. The value of the opening angle β of the flanks of the nut 18 in this embodiment is equal to the value of the opening angle μ of the flanks of the thread 24 of the roller. The contact of the rollers 22 on each flank 20a, or 20b, of the thread of the nut is not situated in the middle of the said flank, and the contact pressure exerted by the flanks of each roller on the flanks 20a, or 20b, of the nut is not distributed over the entire length of the said flanks.

Figure 6:
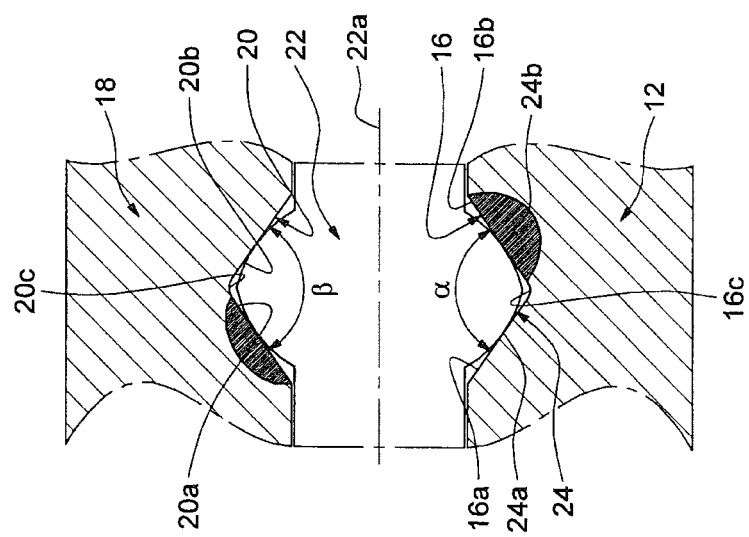
FIG. 6 is a partially sectioned view of a roller screw mechanism according to a second illustrative embodiment of the invention.

In this embodiment, only the screw 12 comprises a thread 16 of which the value of the opening angle α is greater than the value of the opening angle μ of the flanks of the roller 22. In a variant embodiment, as illustrated in FIG. 6, in which the identical elements bear the same references, it is also possible to provide the nut with a thread 20, of which the value of the opening angle β of the flanks of the nut 18 is greater than the value of the opening angle of the flanks of the roller 22. In the illustrated variant embodiment, the thread 20 of the nut is symmetrical in relation to the thread 16 of the screw taking into account an axial plane containing the axis 22a of the rollers. The value of the opening angle β of the flanks of the nut 18 is thus equal to that of the opening angle α of the flanks 16a, 16b of the thread of the screw.

In another variant embodiment, it may still be possible to provide only the nut 18 with a thread, of which the value of the opening angle is greater in relation to the value of the opening angle of the flanks of each roller.

In the embodiments described above, the thread 16 of the screw and the thread 20 of the nut exhibit a triangular profile in cross section. It is possible, however, to provide other types of profile, for example trapezoidal or round.

The present invention is illustrated on the basis of a planetary roller screw mechanism. It is also possible, without departing from the scope of the invention, to provide a thread for the screw and/or for the nut of the kind described previously for a recirculating roller screw.

The invention claimed is:

1. A roller screw mechanism providing a screw, the mechanism comprising:
   an external thread, with a nut arranged around and coaxial with the screw, the nut having an internal thread, and with a plurality of rollers interposed between the screw and the nut and comprising flanks of the rollers interacting with the external and internal threads of the screw and the nut, and wherein
   the value of an opening angle (α, β) of flanks of at least one of the external and internal threads is greater than the value of the opening angle (μ) of the flanks of the rollers,
   wherein the value of the opening angle (α) of the flanks of the external thread of the screw is greater than the value of the opening angle (β) of the flanks of the internal thread of the nut.

2. The mechanism according to claim 1, wherein only the value of the opening angle (α) of the flanks of the external thread of the screw is greater than the value of the opening angle (μ) of the flanks of the rollers, and wherein
   the value of the opening angle (β) of the flanks of the internal thread of the nut being equal to the value of the opening angle (μ) of the flanks of the rollers.

3. The mechanism according to claim 1, wherein the value of the opening angle (α, β) of the flanks of at least one of the external and internal threads is greater than or equal to 90°.

4. The mechanism according to claim 3, wherein the value of the opening angle (α, β) of the flanks of at least one of the external and internal threads is less than or equal to 110°.

5. The mechanism according to claim 4, wherein the value of the opening angle (α, β) of the flanks of at least one of the external and internal threads is greater than or equal to 91° and less than or equal to 95°.

6. The mechanism according to claim 1, wherein the flanks of the external and internal threads of the screw and the nut are rectilinear.

7. The mechanism according to claim 1, wherein each roller includes an external thread in engagement with the external thread of the screw and with the internal thread of the nut.

8. The mechanism according to claim 1, wherein the flanks of the rollers are convex.

9. An actuating cylinder comprising:
a rotational drive means, and
a roller screw mechanism, the roller screw mechanism having:
an external thread, with a nut arranged around and coaxial with the screw, the nut having an internal thread, and with a plurality of rollers interposed between the screw and the nut and comprising flanks of the rollers interacting with the external and internal threads of the screw and the nut, and wherein
the value of an opening angle (α, β) of flanks of at least one of the external and internal threads is greater than the value of the opening angle (μ) of the flanks of the rollers, and wherein
wherein the value of the opening angle (α) of the flanks of the external thread of the screw is greater than the value of the opening angle (β) of the flanks of the internal thread of the nut, and wherein
the screw of the mechanism is coupled to the drive means.

10. A roller screw mechanism providing a screw, the mechanism comprising:
an external thread, with a nut arranged around and coaxial with the screw, the nut having an internal thread, and with a plurality of rollers interposed between the screw and the nut and comprising flanks of the rollers interacting with the external and internal threads of the screw and the nut, and wherein
the value of an opening angle (α, β) of flanks of at least one of the external and internal threads is greater than the value of the opening angle (μ) of the flanks of the rollers,
wherein only the value of the opening angle (α) of the flanks of the external thread of the screw is greater than the value of the opening angle (μ) of the flanks of the rollers, and wherein
the value of the opening angle (β) of the flanks of the internal thread of the nut being equal to the value of the opening angle (μ) of the flanks of the rollers.

11. The mechanism according to claim 10, wherein the value of the opening angle (α, β) of the flanks of at least one of the external and internal threads is greater than or equal to 90°.

12. The mechanism according to claim 11, wherein the value of the opening angle (α, β) of the flanks of at least one of the external and internal threads is less than or equal to 110°.

13. The mechanism according to claim 12, wherein the value of the opening angle (α, β) of the flanks of at least one of the external and internal threads is greater than or equal to 91° and less than or equal to 95°.

14. The mechanism according to claim 10, wherein the flanks of the external and internal threads of the screw and the nut are rectilinear.

15. The mechanism according to claim 10, wherein each roller includes an external thread in engagement with the external thread of the screw and with the internal thread of the nut.

16. The mechanism according to claim 10, wherein the flanks of the rollers are convex.

* * * * *